Mar. 20, 1923
G. R. RICH
VALVE TAPPET FOR INTERNAL COMBUSTION ENGINES
Filed Feb. 5, 1923
1,449,193
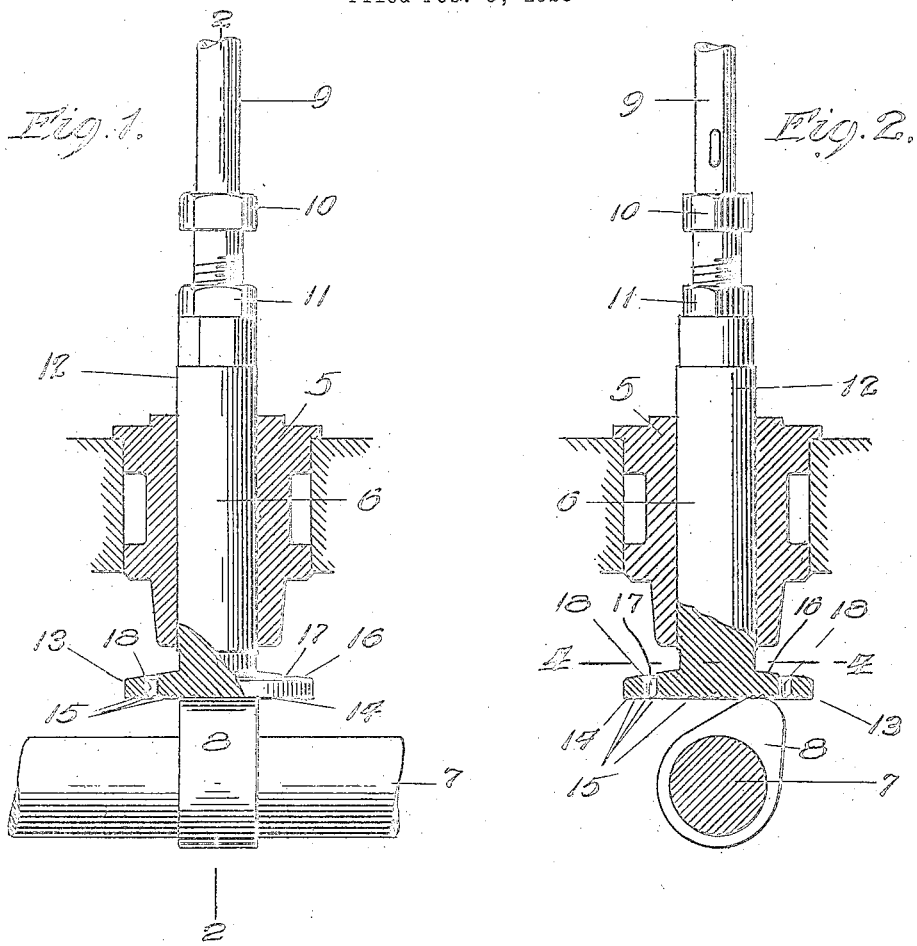
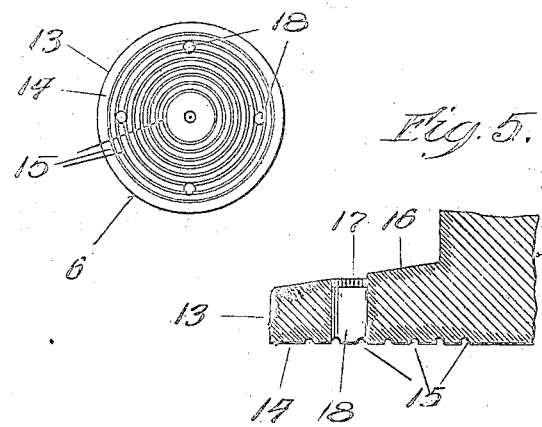
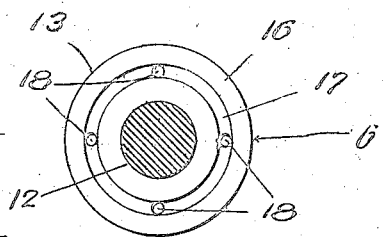
Inventor;
George R. Rich,
by Charles O. Hervey
his Atty.

Patented Mar. 20, 1923.

1,449,193

UNITED STATES PATENT OFFICE.

GEORGE R. RICH, OF BATTLE CREEK, MICHIGAN.

VALVE TAPPET FOR INTERNAL-COMBUSTION ENGINES.

Application filed February 5, 1923. Serial No. 616,880.

*To all whom it may concern:*

Be it known that I, GEORGE R. RICH, a citizen of the United States, and a resident of Battle Creek, Calhoun County, and State of Michigan, have invented certain new and useful Improvements in Valve Tappets for Internal-Combustion Engines, of which the following is declared to be a full, clear, and exact description.

This invention relates to valve tappets for internal combustion engines, and its principal object is to provide against the rapid deterioration of the bearing faces of valve tappet heads. It is well known that with the ordinary form of mushroom valve tappets, especially when first installed in motors, and because of improper lubrication, the cams rapidly wear away the bearing faces of the tappet heads, thereby interfering with the proper lifting and seating of the valves, and causing annoying, clicking noises between the tappet and the valve and between the tappet and the cam. Moreover, in the process of machining and hardening valve tappets, the hard outer surface is often removed in grinding the bearing face of a tappet head, thereby exposing the softer metal of the head to the action of the cam, which soon wears away the true bearing face of the tappets. One of the reasons for the rapid deterioration of the bearing face of a tappet is that in new motors and also in motors which have been operated for some time, the bearing face of the tappet head is not properly lubricated. According to the usual practice in the automobile industry, the bearing faces of tappet heads receive their lubrication from oil which is splashed upon them from the crank case, but when it is understood that a valve seats in about one two hundredth of a minute when a motor is running at normal low speed, it will be understood that the cam passes across the bearing face of the tappet head in a very short space of time. Because of the pressure of the cam on the bearing face of the tappet head, it squeezes away any oil that may have accumulated, each time that the cam passes over the bearing face and there is not sufficient time between the successive strokes of the cam for oil to gather on the bearing face and properly lubricate the parts.

I have overcome these objectionable features by providing oil distributing channels on the bearing face of the tappet head, and further, by providing an oil collecting channel on the back of the tappet head which channel communicates with one or more of the oil distributing channels through passages that lead through the head. The invention consists therefore, in a valve tappet, having a head formed with oil distributing channels in its bearing face in which oil is received and distributed to the bearing face of the tappet head. It further consists in a valve tappet, having a head formed with oil distributing channels in its bearing face and formed with an oil collecting channel on the back of its head, which channel communicates with the oil distributing channels through suitable oil passages. The invention further consists in the several novel features hereinafter fully set forth and claimed.

The invention is clearly illustrated in the accompanying drawing, in which:

Fig. 1 is a view partly in side elevation and partly in vertical section of a valve tappet embodying one form of the invention, its bushing and a fragment of an associated cam shaft; Fig. 2 is a vertical cross section thereof taken on the line 2—2 of Fig. 1; Fig. 3 is an end view looking at the bottom or bearing face of the tappet; Fig. 4 is a horizontal section of the tappet taken on the line 4—4 of Fig. 2, and Fig. 5 is an enlarged cross section of a fragment of the tappet head.

Referring to said drawing which illustrates one form of the invention, the reference character 5 designates a bushing of usual form, in which the valve tappet 6 is slidably and rotatively mounted, in accordance with the common practice. 7 designates a fragment of a cam shaft on which are mounted the cams, one of which is shown at 8, and said cam cooperates with the tappet 6 to unseat an associated valve, a fragment of the stem of which is seen at 9. As is customary in one form of valve mechanism, the tappet is provided with an adjustment screw 10 and lock nut 11 for affording adjustment between the tappet and valve stem. The tappet is preferably of the "mushroom" type and comprises a stem 12, formed on one end with a mushroom or disc like tappet head 13. The lower face 14 of the tappet head comprises its bearing face, and the cam 8 travels across said bearing face in performing its function of lifting the tappet and unseating the valve.

According to the present invention, the bearing face 14 of the tappet head is formed with a number of oil distributing channels 15 which, in the preferred form, comprise annular concentric grooves cut into the bearing face of the tappet head. On the back 16 of the tappet head 13 is formed an oil collecting channel 17, preferably in the form of an annular groove, cut into the back 16, which groove communicates with one or more, preferably two, of the oil distributing channels 15, through oil passages 18 that lead through the tappet head.

In constructing a valve tappet in accordance with the present invention, the rough body is first forged or hammered into shape as is well understood, and thereafter it is machined. The grooves 15, 17 are then cut into the bearing face 14 and back 16 of the tappet head, and the holes 18 are drilled, after which the tappet is hardened, preferably case hardened. The bearing face is then ground and the stem is ground, as usual.

It will be observed that by reason of the grooves 15 which are formed in the bearing face of the tappet head, the bearing face portion is hardened to a greater depth than if the grooves were omitted, and this permits greater latitude for the workman in grinding the bearing face of the tappet head, since he may grind off more of the surface without exposing the softer underlying portion of the tappet head.

In operation, there is more or less oil splashed upon the parts and considerable oil collects upon the back or top of the tappet head. Consequently oil collects in the channel 17 and flows down through the oil passages 18 and flows over the bearing face of the tappet head and collects in the channels in said bearing face. During the operation of the motor, the associated cam engages the tappet head and lifts it as usual, but oil gathers in the grooves 15 and supplies the bearing face of the tappet head with the necessary lubricant to prevent any undue wear between the contacting surfaces of the valve tappet and cam. The oil collects in the oil distributing channels and replenishes that which is wiped away by the cam in passing over the bearing face.

I have found from actual experience that when first installed in a motor, there is great danger of injury to the valve tappets, due to insufficient lubrication between the bearing face of the tappet head and the cam. The result is that frequently the heat (created by the friction between the contacting faces of the tappet and the cam) draws the hardness of the bearing face of the tappet head, and the face becomes rapidly worn, sometimes annular grooves are cut into it by the cam, so that the action of the tappet becomes defective, the valve is not properly actuated, and the motor does not operate with the maximum efficiency. I have found that with the use of a valve tappet, containing the invention above described, the tappet operates efficiently from the moment of installation, assuming, of course, that there is lubricant present for lubricating the tappet stem. Moreover, from actual practice it is found that because of the constant presence of a film of oil on the bearing face of the tappet head, the clicking noise which is often present, is eliminated, inasmuch as the cam and tappet are held spaced from each other by a film of oil.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. A valve tappet for internal combustion engines, having a head formed with oil distributing channels in its bearing face.

2. A valve tappet for internal combustion engines, having a head formed with annular oil distributing channels in its bearing face.

3. A valve tappet for internal combustion engines, having a head formed with concentric, annular oil distributing channels in its bearing face.

4. A valve tappet for internal combustion engines, having a head formed with oil distributing channels in its bearing face, and an oil passage, leading from the back of said head and extending through said head to its bearing face.

5. A valve tappet for internal combustion engines, having a disc like head formed with annular oil distributing channels in its bearing face, an oil conducting channel in the back of its head and an oil passage leading from the channel on the back of the head and extending through said head to a channel on the bearing face of the head.

6. A valve tappet for internal combustion engines, having a disc like head formed with concentric, annular oil distributing grooves in its bearing face, an annular oil conducting groove on the back of its head and a plurality of oil conducting holes leading from said oil conducting groove to a plurality of oil distributing grooves in said bearing face.

GEORGE R. RICH.